United States Patent
Cowham (10) Patent No.: US 9,349,114 B2
(45) Date of Patent: May 24, 2016

(54) SYSTEMS AND METHODS FOR MANAGING EVENT MESSAGES

(75) Inventor: Adrian Cowham, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1477 days.

(21) Appl. No.: 11/591,411

(22) Filed: Oct. 31, 2006

(65) Prior Publication Data
US 2008/0104229 A1 May 1, 2008

(51) Int. Cl.
*G06F 15/173* (2006.01)
*G06Q 10/10* (2012.01)
*H04L 12/24* (2006.01)
*G06Q 10/06* (2012.01)

(52) U.S. Cl.
CPC ............... *G06Q 10/10* (2013.01); *G06Q 10/06* (2013.01); *H04L 12/242* (2013.01)

(58) Field of Classification Search
CPC .................................................... H04L 12/242
USPC ............ 370/230, 412, 449, 241, 252; 706/16; 709/203, 223, 224, 226, 231; 455/566; 718/105; 705/1, 35; 707/102
See application file for complete search history.

(56) References Cited

U.S. PATENT DOCUMENTS

| | | | | |
|---|---|---|---|---|
| 6,163,773 | A * | 12/2000 | Kishi | 706/16 |
| 6,501,733 | B1 * | 12/2002 | Falco et al. | 370/235 |
| 6,519,264 | B1 * | 2/2003 | Carr et al. | 370/449 |
| 6,700,869 | B1 * | 3/2004 | Falco et al. | 370/230 |
| 6,711,137 | B1 * | 3/2004 | Klassen et al. | 370/252 |
| 7,155,509 | B1 * | 12/2006 | Cordsmeyer et al. | 709/224 |
| 7,467,067 | B2 * | 12/2008 | Marvasti | 702/186 |
| 7,685,089 | B2 * | 3/2010 | Nochta et al. | 706/62 |
| 7,793,316 | B2 * | 9/2010 | Mears | G06Q 30/02 348/180 |
| 2002/0019945 | A1 * | 2/2002 | Houston et al. | 713/201 |
| 2003/0140158 | A1 * | 7/2003 | Lee et al. | 709/231 |
| 2004/0047423 | A1 * | 3/2004 | Viscito et al. | 375/240.26 |
| 2004/0128388 | A1 * | 7/2004 | Kaiser | G06F 17/30943 709/227 |
| 2004/0153473 | A1 * | 8/2004 | Hutchinson et al. | 707/104.1 |
| 2005/0018611 | A1 * | 1/2005 | Chan et al. | 370/241 |
| 2005/0080639 | A1 * | 4/2005 | Tang | 705/1 |
| 2005/0138235 | A1 * | 6/2005 | Ali Khan et al. | 710/24 |
| 2005/0283505 | A1 * | 12/2005 | Fujimoto | 708/200 |
| 2006/0036737 | A1 * | 2/2006 | Kumar et al. | 709/226 |
| 2006/0040711 | A1 * | 2/2006 | Whistler | 455/566 |
| 2006/0074970 | A1 * | 4/2006 | Narayanan et al. | 707/102 |
| 2006/0109857 | A1 * | 5/2006 | Herrmann | 370/412 |
| 2006/0242295 | A1 * | 10/2006 | Husemann et al. | 709/224 |
| 2006/0271826 | A1 * | 11/2006 | Desai et al. | 714/38 |
| 2007/0061433 | A1 * | 3/2007 | Reynolds et al. | 709/223 |

(Continued)

OTHER PUBLICATIONS

Oliner et al. "Critical Event Prediction for Proactive Management in Largescale." SIGKDD '03 (2003): 426-35.*
Bahati et al. "Using Policies to Drive Autonomic Management." Proceedings of the 2006 International Symposium on a World of Wireless, Mobile and Multimedia Networks (2006).*

(Continued)

*Primary Examiner* — Imad Hussain
(74) *Attorney, Agent, or Firm* — Thomas, Kayden, Horstemeyer & Risley, LLP (57) ABSTRACT

In one embodiment a method for managing event messages includes predicting an event message arrival rate, determining a current capacity of an event message repository in which received event messages are stored, and calculating a time at which to perform event message deletion relative to the predicted event message arrival rate and the determined current capacity of the event message repository.

21 Claims, 5 Drawing Sheets

(56) References Cited

U.S. PATENT DOCUMENTS

| | | | |
|---|---|---|---|
| 2007/0113031 A1* | 5/2007 | Brown et al. | 711/160 |
| 2007/0171830 A1* | 7/2007 | Vulkan et al. | 370/235 |
| 2007/0198629 A1* | 8/2007 | Ganguly et al. | 709/203 |
| 2007/0265947 A1* | 11/2007 | Schimpf et al. | 705/35 |
| 2007/0271570 A1* | 11/2007 | Brown et al. | 718/105 |
| 2008/0133212 A1* | 6/2008 | Krishnamurthy et al. | 703/22 |

OTHER PUBLICATIONS

Sayee et al. "Stability of Scheduled Message Communication Stability of Scheduled Message Communication". Publication. IEEE, 2006. Print.*

Wang et al. Summary-based routing for content-based event distribution networks. SIGCOMM Comput. Commun. Rev. 34, 5 (Oct. 2004), 59-74.*

* cited by examiner

SYSTEMS AND METHODS FOR MANAGING EVENT MESSAGES

BACKGROUND

Devices and applications often transmit event messages to a centralized location for the purpose of maintaining a record of event occurrences that can, for example, be referenced later during system trouble shooting. One example of such messages are syslog messages that are transmitted to a syslog daemon for storage in a message repository. As event messages are collected, the event message repository can become full or overflow. In such a case, important messages can be deleted in favor of newer messages. In addition or exception, performance of the machine on which the repository resides can degrade.

Event messages and the repository in which they are stored are normally managed to avoid such problems. In particular, messages are deleted according to pre-established rules or criteria in order to reduce the number of stored messages and, therefore, provide space for new messages in the message repository. Currently, there are several known processes for message management. In one process, the contents of the repository are checked and adjusted real time. For example, each time an event message is received, the capacity of the repository is checked to determine whether a maximum allowed size has been or will be exceeded. If so, event messages are deleted according to the pre-established rules to make more room. Such a process is inefficient because it involves a relatively high amount of overhead. In particular, the size determination is made each time a new message is received, regardless of how many messages are currently stored.

In a second process, message deletion occurs on a periodic basis. That is, after a predetermined amount of time has elapsed since the last time deletion was performed, a deletion process is repeated, again according to pre-established rules. That process also has disadvantages. For example, if the selected period is too long, an overflow condition may occur before the period expires. Conversely, if the period is too short, the process is unnecessarily inefficient as in the previously-described process.

SUMMARY

Disclosed are systems and methods for managing event messages. In one embodiment a method includes predicting an event message arrival rate, determining a current capacity of an event message repository in which received event messages are stored, and calculating a time at which to perform event message deletion relative to the predicted event message arrival rate and the determined current capacity of the event message repository.

BRIEF DESCRIPTION OF THE DRAWINGS

The components in the drawings are not necessarily to scale, emphasis instead being placed upon clearly illustrating the principles of the present disclosure. In the drawings, like reference numerals designate corresponding parts throughout the several views.

DETAILED DESCRIPTION

As described above, current processes for managing event messages are disadvantageous. As described below, however, such disadvantages can be avoided or at least reduced by managing the event messages in a predictive manner. Specifically, the rate at which new event messages will be received or stored can be predicted to determine when message deletion should be performed. In some embodiments described in the following, event message arrival rates are predicted from historical data pertaining to past message arrival. When a future message arrival rate is predicted, the prediction can be used in conjunction with a current repository capacity to determine when event messages should be deleted from the repository, thereby increasing the efficiency of event message management.

Figure 1:
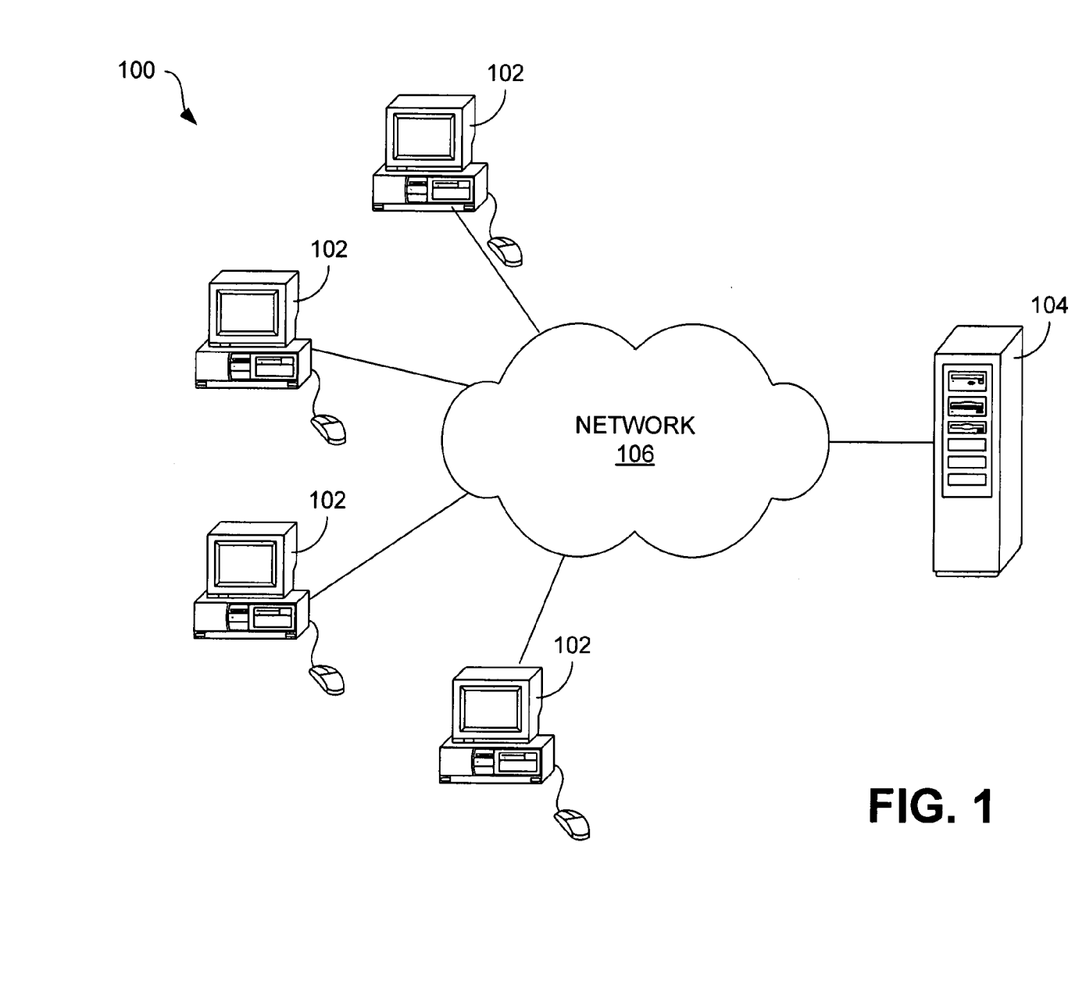
FIG. 1 is block diagram of an embodiment of a system in which event messages can be managed.

Referring now to the drawings, in which like numerals indicate corresponding parts throughout the several views, FIG. 1 illustrates an example system 100 in which message management in accordance with the present disclosure can be performed. As indicated in that figure, the system 100 generally comprises multiple client computers 102 and a server computer 104. In the embodiment of FIG. 1, the client computers 102 comprise personal computers (PCs) that are configured to communicate with the server computer 104. More particularly, the PCs can transmit event messages to the server computer 104 via a network 106. Although PCs are illustrated in FIG. 1 by way of example, it will be appreciated that substantially any network-enabled device connected to the network can transmit event messages to the server computer 104. Therefore, although PCs are illustrated in FIG. 1 as example event message senders, many other types of devices may comprise event message senders. Moreover, although event messages have been described as being transmitted to the server computer 104, it will be appreciated that such messages can be transmitted internally within a given device, such as one or more of the client computers 102 or the server computer 104. Therefore, an event message need not be transmitted from one device to another device.

The network 106, when present, can comprise a single network, such as a local area network (LAN), or may comprise a collection of networks (LANs and/or wide area networks (WANs)) that are communicatively coupled to each other. In some embodiments, the network 106 may comprise part of the Internet.

Figure 2:
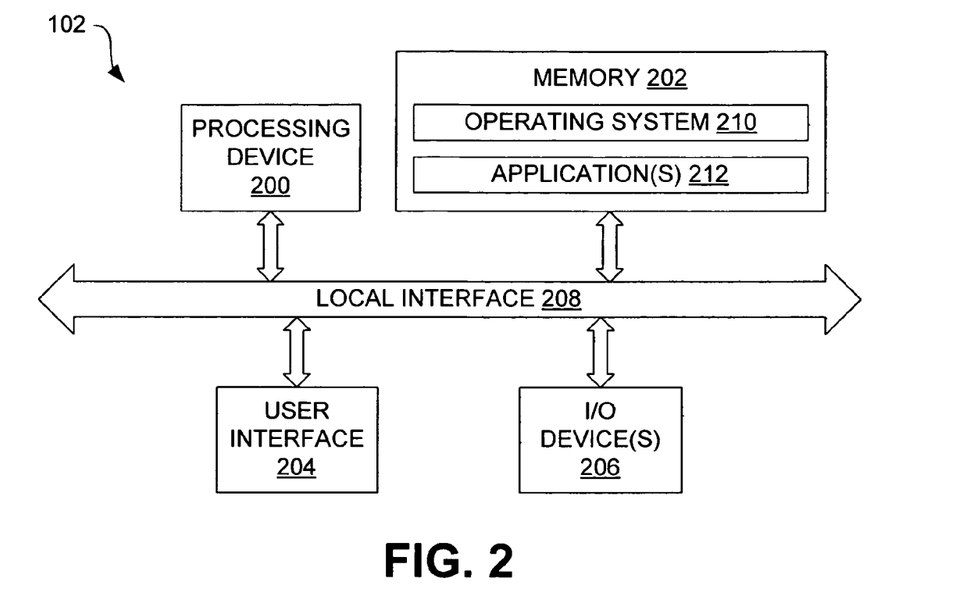
FIG. 2 is a block diagram of an embodiment of a client computer shown in FIG. 1.

FIG. 2 is a block diagram illustrating an example architecture for one of the client computers 102. The computer 102 of FIG. 2 comprises a processing device 200, memory 202, a user interface 204, and at least one I/O device 206, each of which is connected to a local interface 208.

The processing device 200 can include a central processing unit (CPU) or an auxiliary processor among several processors associated with the computer 102, or a semiconductor based microprocessor (in the form of a microchip). The memory 202 includes any one of or a combination of volatile memory elements (e.g., RAM) and nonvolatile memory elements (e.g., hard disk, ROM, tape, etc.).

The user interface 204 comprises the components with which a user interacts with the computer 102. The user interface 204 may comprise, for example, a keyboard, mouse, and a display, such as a cathode ray tube (CRT) or liquid crystal display (LCD) monitor. The one or more I/O devices 206 are adapted to facilitate communications with other devices and may include one or more communication components, such as a modulator/demodulator (e.g., modem), a wireless (e.g., radio frequency (RF)) transceiver, a network card, etc.

Figure 3:
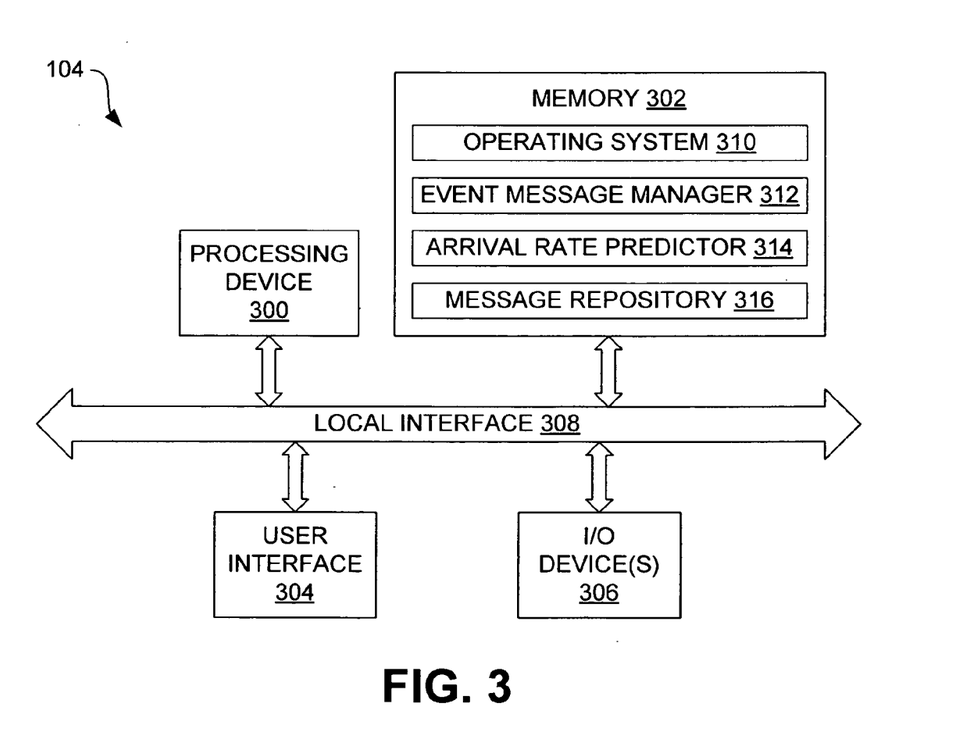
FIG. 3 is block diagram of an embodiment of a server computer shown in FIG. 1

The memory 202 comprises various programs including an operating system 210 and one or more applications 212. The operating system 210 controls the execution of other programs and provides scheduling, input-output control, file and data management, memory management, and communication control and related services. The applications 212 can comprise any application that executes on the computer 102 and is capable of issuing an event message to a message manager that exists on the client computer (not shown) or on the server computer 104 (FIG. 3). Accordingly, one or more of the applications 212 can be considered to comprise event message senders.

FIG. 3 is a block diagram illustrating an example architecture for the server computer 104 shown in FIG. 1. As indicated in FIG. 3, the server computer 104 comprises many of the same components as the client computer 102 shown in FIG. 2, including a processing device 300, memory 302, a user interface 304, and at least one I/O device 306, each of which is connected to a local interface 308. In some embodiments, those components have the same or similar construction and/or function of like-named components described above in relation to FIG. 2. Accordingly, a detailed discussion of the components of FIG. 3 is not presented herein.

As indicated in FIG. 3, the memory 302 of the server computer 104 comprises an operating system 310, an event message manager 312, and an event message arrival rate predictor 314. The operating system 310 controls the execution of other programs and provides scheduling, input-output control, file and data management, memory management, and communication control and related services. The event message manager 312 is configured to receive event messages from other devices and/or applications residing on the server computer 104 and store them in an event message repository or log 316. The event message arrival rate predictor 314 is configured to predict the arrival rate of future messages to enable the event message manager 312 to know when messages should be deleted from the event message repository 316 to make room for new messages and avoid overflow. As described below, the arrival rate predictor 314 can predict the arrival rate of future messages in view of historical data as to previous message receipt or storage.

Various programs (i.e. logic) have been described herein. The programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in the flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4:
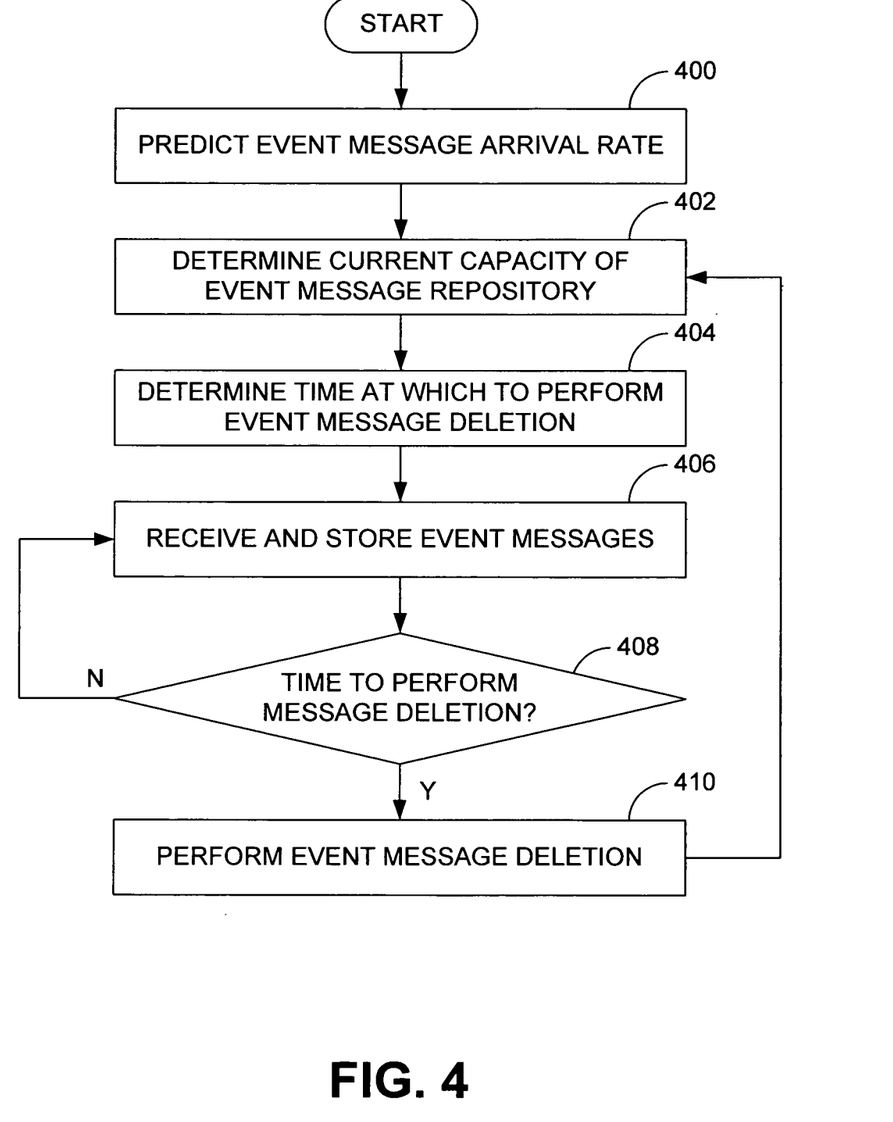
FIG. 4 is a flow diagram that illustrates an embodiment of a method for managing event messages.

FIG. 4 illustrates an example method for managing event messages. Beginning with block 400 of that figure, an event message arrival rate is predicted. More particularly, the rate at which event messages will be received by the event message manager or the rate at which those received events will be stored in the event message repository if not all received messages are stored, is predicted. As described in greater detail below in relation to FIG. 5, the prediction is made in relation to historical data as to the previous receipt and/or storage of event messages. Through such prediction, it can be statistically determined when event message deletion should be performed, for example when the event message repository is most likely to be full or contain the maximum permissible number of messages or amount of data.

Turning to block 402, the current capacity of the event message repository is determined. In the context of this disclosure, the term current "capacity" is meant to convey the current state of the repository in terms of the number of messages or amount of data currently stored in the repository versus the maximum number of messages or amount of data that can be or is deemed acceptable to be stored in the repository. Therefore, the "capacity" of the repository refers to how full the repository is.

Referring to block 404, the time at which to perform message deletion is then determined. That determination is relatively simple once the current state of the repository and the predicted rate at which new event messages will be added to the repository are known. For instance, the time to deletion, $T_D$, can be determined using the following relation:

$$T_D=(M_{max}-M_{curr})/AR \quad \text{(Equation 1)}$$

where $M_{max}$ is the maximum number of messages, $M_{curr}$ is the current number of messages, and AR is the predicted arrival rate, meaning the predicted rate at which messages will arrive at the event message manager or arrive within the repository after being stored there in cases in which not all received messages are stored. Therefore, to take a simple example, if the maximum number of messages that is deemed permissible for the repository to store is 100,000, the repository currently holds 1,000 messages, and the predicted arrival rate is 100 messages per minute, the time to deletion is 990 minutes, or 16.5 hours.

Next, with reference to block 406 of FIG. 4, event messages are received and stored in the event message repository. The types of messages that are received are unimportant to the present disclosure. As stated above, however, the messages can comprise internal messages generated and stored within a given machine, or messages that are transmitted from one machine to another machine. An example of the former are messages stored in relation to an event viewer of an operating system that executes on a PC. An example of the latter are syslog messages that are transmitted over a network to a syslog daemon of a syslog server.

At decision block 408 it is determined whether the time to perform event message deletion has arrived. In keeping with the example described above, that time would be 16.5 hours from the time at which the aforementioned calculations were performed. If that time has not yet arrived, flow returns to block 406 at which further event messages are received and stored.

Event messages are continually received and stored until the time for performing deletion has arrived. At that time, the deletion process is performed, as indicated in block 410. As described above, various rules or criteria can be used in determining which event messages to delete from the message repository. In some embodiments, the oldest messages are deleted in a first-in-first-out scheme (FIFO). In other embodiments, particular types of messages can be deleted before others. For example, if the messages are syslog messages, messages having the lowest severity can be deleted prior to syslog messages having higher severity so that the messages having the highest severity are retained longest.

Irrespective of which messages are deleted, flow can return to block 402 and the capacity of the repository can be determined after messages were deleted. The time to perform the next deletion process can then be determined in view of the predicted event message arrival rate and that newly-determined capacity. Therefore, flow continues in the manner described above such that messages are intermittently deleted relative to the predicted rate at which the repository will be filled or reach its maximum permissible capacity.

Figure 5:
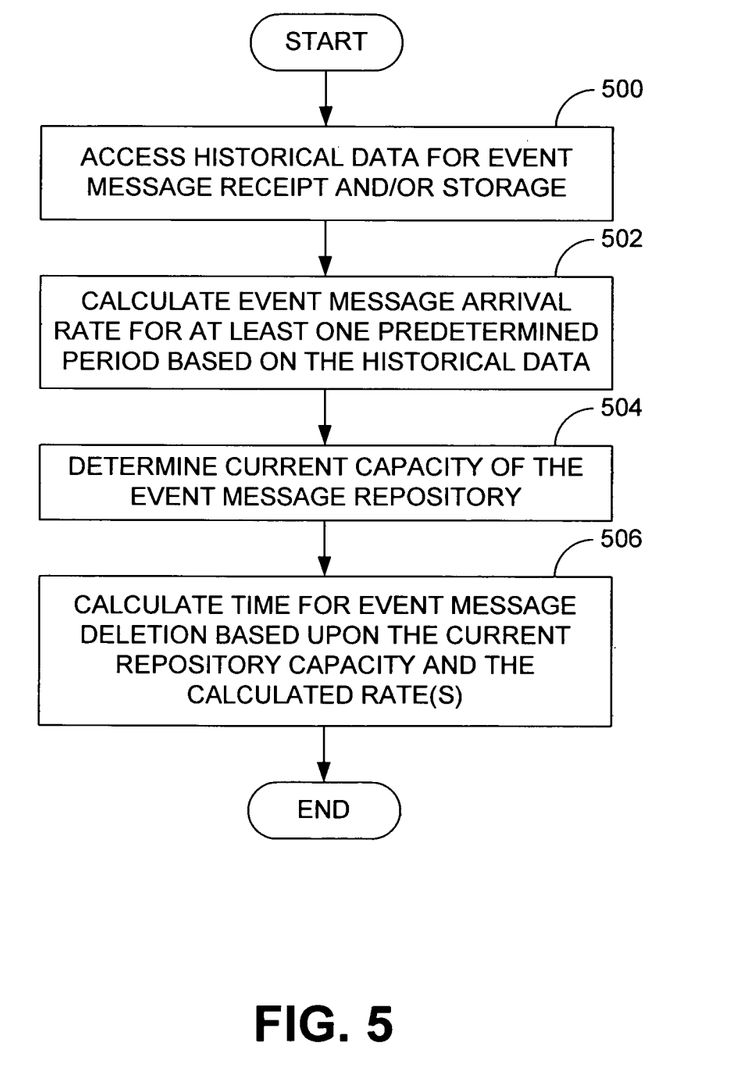
FIG. 5 is a flow diagram that illustrates an embodiment of a method for determining when to perform event message deletion.

FIG. 5 illustrates an example of a method for determining when to perform event message deletion. In some embodiments, the method can be performed by the event message arrival rate predictor 314 by itself or with assistance from the event message manager 312. In the latter case, the arrival rate is predicted by the arrival rate predictor 314 and the event message manager 312 uses that prediction to determine when to delete event messages.

Beginning with block 500 of FIG. 5, historical data for event message receipt and storage is accessed. By way of example, the historical data comprises data stored in the event message repository, which identifies when each message was received or stored. From that information, the average rate at which the messages were received or stored can be determined. Alternatively, the historical data can comprise data stored in another database (not shown) that contains information about receipt and/or storage of messages over a relatively long period of time, such as a month or several months. The greater the time period used in the arrival rate determination, the more accurate the rate will be prediction.

Next, an event message arrival rate is calculated for at least one predetermined period based upon the historical data, as indicated in block 502. In some embodiments, the rate can be calculated relative to all of the historical data. For example, if the historical data covers receipt or storage of messages over a period of 6 months, the rate can be calculated as the average rate at which messages were received or stored over that entire period. In other embodiments, one or more rates can be calculated for discrete periods of time. For example, separate rates can be determined for each day of the week to take into account the relative rate at which messages are received or stored on any given day of the week. As another example, separate rates can be determined for weekdays as opposed to weekend days. As a further example, separate rates can be determined for daytime hours versus nighttime hours. Accordingly, multiple rates can be calculated for multiple different segments of time, as desired. The rate or rates calculated in relation to block 502 are then used as the predicted rates for future messages.

Next, with reference to block 504, the current capacity of the event message repository is determined as described above in relation to FIG. 4. At that point, the time for the event message deletion process can be calculated based upon the current repository capacity and the calculated message arrival rate or rates, as indicated in block 506.

Notably, the arrival rate prediction can be recalculated periodically to account for changes in the environment (e.g., single machine or network) in which the event messages are transmitted. For example, if a network initially comprises a relatively small number of computers or other devices and later is expanded to comprise a far greater number of computers or other devices, recalculation of the arrival rate prediction based upon new historical data after the expansion occurred may be warranted. Periodic recalculation of the arrival rate prediction can, of course, be conducted as often as desired to maintain the accuracy of the prediction. For instance, recalculation can be performed weekly, monthly, semi-annually, or annually.

In the foregoing, the time for performing message deletion is described as being calculated based upon the maximum number of messages, the current number of messages, and the rate(s) at which messages are received or stored. Notably, the time for performing message deletion could be based upon the amount of data instead of the number of messages. In such a case, the time at which to perform deletion would be determined relative to the maximum amount of data the repository can or is to hold, the current amount of data stored in the repository, and the rate(s) at which data is stored in the repository. The rate(s) could be determined in such a situation from the historical data assuming that historical data not only identifies each message and when it was received or stored but also the size of each message. In many cases, however, the number of messages and the rate(s) at which messages are received or stored will be adequate given that the size of the messages may be similar.

Figure 6:
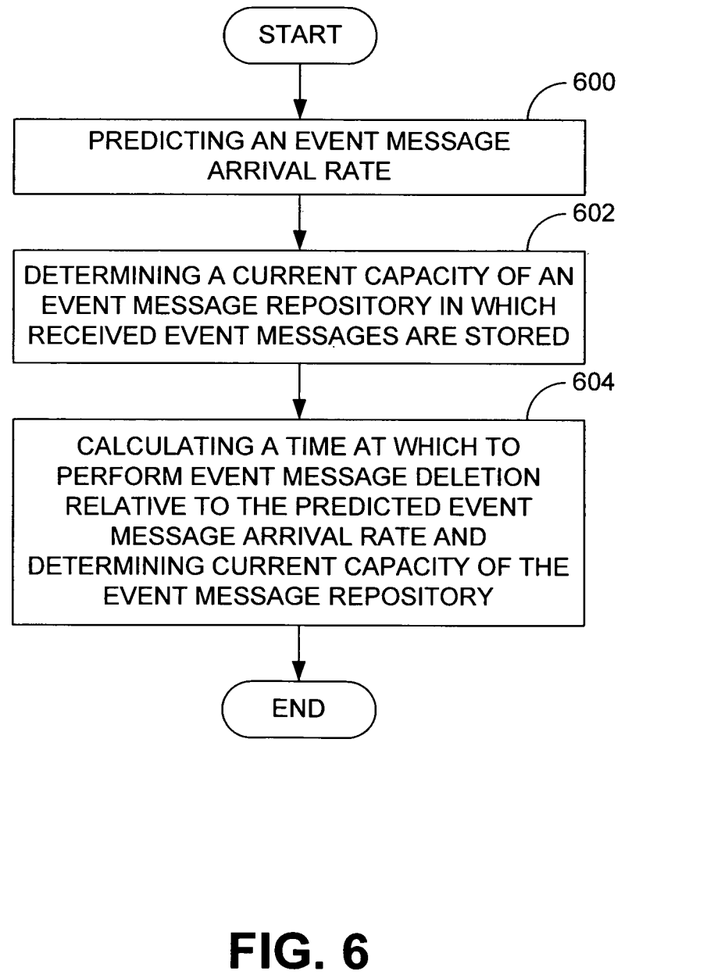
FIG. 6 is a flow diagram that illustrates a further embodiment of a method for managing event messages.

FIG. 6 illustrates a further example method for managing event message management. The method of FIG. 6 comprises predicting an event message arrival rate (600), determining a current capacity of an event message repository in which received event messages are stored (602), and calculating a time at which to perform event message deletion relative to the predicted event message arrival rate and the determined current capacity of the event message repository (604).

As can be appreciated from the foregoing, efficient event message management can be obtained through the systems and methods described herein. Furthermore, given that the systems and methods predict arrival rates for the particular environment in which they are used, the systems and methods are adaptive so as to be custom tailored to that environment. Therefore, the systems and methods are effective for substantially any environment, whether it be one in which many event messages are transmitted or a relatively small number of event messages are transmitted.

Although various embodiments of systems and methods for event message management have been described herein, those embodiments are mere example implementations of the systems and methods. Therefore, alternative embodiments are possible. Those embodiments are intended to fall within the scope of this disclosure.

The following are claimed:

1. A method for managing event messages, the method comprising:
   predicting, by a processing device of a computer, an event message arrival rate;
   determining, by the processing device, a maximum number of event messages permissible to be stored in a repository and a current number of event messages presently stored in the repository; and
   calculating, by the processing device, a time at which to delete event messages from the repository based upon a difference between the maximum number of event messages and the current number of event messages relative to the predicted event message arrival rate.

2. The method of claim 1, wherein predicting an event message arrival rate comprises determining a previous message arrival rate from historical data pertaining to previous arrivals of event messages.

3. The method of claim 2, wherein predicting an event message arrival rate further comprises determining a number of event messages that arrived over a given period of time.

4. The method of claim 2, wherein predicting an event message arrival rate further comprises determining an amount of data that was stored in the event message repository over a given period of time.

5. The method of claim 1, wherein predicting an event message arrival rate comprises computing multiple event message arrival rates for discrete periods of time.

6. The method of claim 5, wherein computing multiple event message arrival rates comprises computing separate event message arrival rates for different days of the week.

7. The method of claim 5, wherein computing multiple event message arrival rates comprises computing separate event message arrival rates for different times of day.

8. The method of claim 1, wherein determining the current number of event messages comprises determining an amount of data currently stored in the repository.

9. The method of claim 1, further comprising deleting event messages from the repository at the calculated time.

10. The method of claim 9, further comprising determining a new capacity of the repository after event messages were deleted and recalculating the time at which to delete event messages based upon the predicted event message arrival rate and the new capacity.

11. A non-transitory computer-readable medium that stores instructions that when executed by a processor cause the processor to:
predict a future event message arrival rate;
determine a maximum number of event messages that a repository has stored and a current number of event messages presently stored in the repository; and
calculate a time at which to delete event messages from the repository based upon a difference between the maximum number of event messages and the current number of event messages relative to the predicted event message arrival rate.

12. The non-transitory computer-readable medium of claim 11, wherein to predict an event message arrival rate, the instructions are to cause the processor to determine a previous message arrival rate from historical data pertaining to previous arrival of event messages.

13. The non-transitory computer-readable medium of claim 12, wherein to predict an event message arrival rate, the instructions are to cause the processor to determine a number of event messages that arrived over a given period of time.

14. The non-transitory computer-readable medium of claim 12, wherein to predict an event message arrival rate, the instructions are to cause the processor to determine an amount of data that was stored in the event message repository over a given period of time.

15. The non-transitory computer-readable medium of claim 11, wherein to predict an event message arrival rate, the instructions are to cause the processor to calculate multiple event message arrival rates for discrete periods of time.

16. The non-transitory computer-readable medium of claim 11, wherein the instructions are further to cause the processor to determine an amount of data currently stored in the event message repository.

17. The non-transitory computer-readable medium of claim 11, wherein the instructions are further to cause the processor to delete event messages from the repository at the calculated time.

18. A computer comprising:
a processing device; and
memory including a program to cause the processing device to
predict an event message arrival rate based upon historical data concerning past arrival of event messages,
determine a maximum number of event messages permissible to be stored in a repository and a current number of event messages presently stored in the repository,
calculate a time at which to perform event message deletion based upon a difference between the maximum number of event messages and the current number of event messages relative to the predicted event message arrival rate,
delete event messages from the repository at the calculated time.

19. The computer of claim 18, wherein, to predict the event message arrival rate, the program is to cause the processing device to determine a number of event messages that arrived over a given period of time.

20. The computer of claim 18, wherein, to predict the event message arrival rate, the program is to cause the processing device to determine an amount of data that was stored in the event message repository over a given period of time.

21. The computer of claim 18, wherein the program is to cause the processing device to calculate multiple event message arrival rates for discrete periods of time.

* * * * *